US008438562B2

(12) United States Patent
Sero et al.

(10) Patent No.: US 8,438,562 B2
(45) Date of Patent: *May 7, 2013

(54) ONE CLICK DEPLOYMENT

(75) Inventors: Pascal Sero, Foster City, CA (US); Marc Dangeard, Sausalito, CA (US); Kevin Walsh, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/454,997

(22) Filed: Apr. 24, 2012

(65) Prior Publication Data

US 2012/0210235 A1    Aug. 16, 2012

Related U.S. Application Data

(63) Continuation of application No. 11/540,019, filed on Sep. 29, 2006, now Pat. No. 8,176,484, which is a continuation of application No. 09/872,646, filed on May 31, 2001, now Pat. No. 7,134,122.

(51) Int. Cl.
*G06F 9/45*   (2006.01)

(52) U.S. Cl.
USPC ............ 717/177; 717/168; 717/174; 717/178

(58) Field of Classification Search .................... None
See application file for complete search history.

(56) References Cited

U.S. PATENT DOCUMENTS

| | | |
|---|---|---|
| 5,442,791 A | 8/1995 | Wrabetz et al. |
| 5,452,454 A | 9/1995 | Basu |
| 5,485,610 A | 1/1996 | Gioielli et al. |
| 5,572,643 A | 11/1996 | Judson |
| 5,603,034 A | 2/1997 | Swanson |
| 5,606,693 A | 2/1997 | Nilsen et al. |
| 5,627,994 A | 5/1997 | Levy et al. |
| 5,668,986 A | 9/1997 | Nilsen et al. |
| 5,819,066 A | 10/1998 | Bromberg et al. |
| 5,819,092 A | 10/1998 | Ferguson et al. |
| 5,835,724 A | 11/1998 | Smith |
| 5,838,918 A | 11/1998 | Prager et al. |
| 5,845,128 A | 12/1998 | Noble et al. |
| 5,850,433 A | 12/1998 | Rondeau |
| 5,850,548 A | 12/1998 | Williams |

(Continued)

FOREIGN PATENT DOCUMENTS

EP    0367709 A1    5/1990

OTHER PUBLICATIONS

U.S. Appl. No. 09/872,235, filed May 31, 2001.

(Continued)

*Primary Examiner* — Emerson Puente
*Assistant Examiner* — Hiren Patel
(74) *Attorney, Agent, or Firm* — Hickman Palermo Truong Becker Bingham Wong LLP

(57) ABSTRACT

Techniques are provided for deploying applications hosted by an application service provider. An application in a first environment is automatically deployed to a second environment in response to receiving a request over a network from the party for whom the second environment is being hosted. The first environment may be an environment where applications are developed by the party over the network. Deployment of the application may entail provisioning of an environment for the application.

12 Claims, 5 Drawing Sheets

U.S. PATENT DOCUMENTS

| | | | |
|---|---|---|---|
| 5,887,172 A | 3/1999 | Vasudevan et al. | |
| 5,933,647 A | 8/1999 | Aronberg et al. | |
| 5,933,811 A | 8/1999 | Angles et al. | |
| 5,937,163 A | 8/1999 | Lee et al. | |
| 5,950,188 A | 9/1999 | Wildermuth | |
| 5,958,012 A | 9/1999 | Battat et al. | |
| 5,960,432 A | 9/1999 | Werner | |
| 5,978,811 A | 11/1999 | Smiley | |
| 5,991,535 A | 11/1999 | Fowlow et al. | |
| 6,009,274 A | 12/1999 | Fletcher et al. | |
| 6,012,032 A | 1/2000 | Donovan et al. | |
| 6,016,394 A | 1/2000 | Walker | |
| 6,026,433 A | 2/2000 | D'Arlach et al. | |
| 6,044,367 A | 3/2000 | Wolff | |
| 6,052,720 A | 4/2000 | Traversat et al. | |
| 6,055,525 A | 4/2000 | Nusbickel | |
| 6,061,692 A | 5/2000 | Thomas et al. | |
| 6,067,557 A | 5/2000 | Hegde | |
| 6,073,163 A | 6/2000 | Clark et al. | |
| 6,075,938 A | 6/2000 | Bugnion et al. | |
| 6,075,939 A | 6/2000 | Bunnell et al. | |
| 6,076,166 A | 6/2000 | Moshfeghi et al. | |
| 6,094,679 A | 7/2000 | Teng et al. | |
| 6,115,715 A | 9/2000 | Traversat et al. | |
| 6,119,157 A | 9/2000 | Traversat et al. | |
| 6,128,655 A | 10/2000 | Fields et al. | |
| 6,161,125 A | 12/2000 | Traversat et al. | |
| 6,233,582 B1 | 5/2001 | Traversat et al. | |
| 6,237,020 B1 | 5/2001 | Leymann et al. | |
| 6,247,032 B1 | 6/2001 | Bernardo et al. | |
| 6,282,711 B1 | 8/2001 | Halpern et al. | |
| 6,286,029 B1 | 9/2001 | Delph | |
| 6,289,510 B1 | 9/2001 | Nakajima | |
| 6,298,341 B1 | 10/2001 | Mann et al. | |
| 6,313,835 B1 | 11/2001 | Gever et al. | |
| 6,324,681 B1 | 11/2001 | Sebesta et al. | |
| 6,325,540 B1 | 12/2001 | Lounsberry et al. | |
| 6,341,303 B1 | 1/2002 | Rhee et al. | |
| 6,345,278 B1 | 2/2002 | Hitchcock et al. | |
| 6,345,279 B1 | 2/2002 | Li et al. | |
| 6,374,256 B1 | 4/2002 | Ng et al. | |
| 6,378,128 B1 | 4/2002 | Edelstein et al. | |
| 6,408,360 B1 | 6/2002 | Chamberlain et al. | |
| 6,430,624 B1 | 8/2002 | Jamtgaard et al. | |
| 6,445,682 B1 | 9/2002 | Weitz | |
| 6,446,071 B1 | 9/2002 | Callaway et al. | |
| 6,460,141 B1 | 10/2002 | Olden | |
| 6,466,972 B1 | 10/2002 | Paul et al. | |
| 6,477,565 B1 | 11/2002 | Daswani et al. | |
| 6,487,547 B1 | 11/2002 | Ellison et al. | |
| 6,493,871 B1 | 12/2002 | McGuire et al. | |
| 6,510,469 B1 | 1/2003 | Starnes et al. | |
| 6,516,416 B2 | 2/2003 | Gregg et al. | |
| 6,523,036 B1 | 2/2003 | Hickman et al. | |
| 6,523,166 B1* | 2/2003 | Mishra et al. | 717/174 |
| 6,535,896 B2 | 3/2003 | Britton et al. | |
| 6,539,340 B1 | 3/2003 | Robins et al. | |
| 6,553,412 B1 | 4/2003 | Kloba et al. | |
| 6,578,073 B1 | 6/2003 | Starnes et al. | |
| 6,584,548 B1 | 6/2003 | Bourne et al. | |
| 6,604,110 B1 | 8/2003 | Savage et al. | |
| 6,618,857 B1 | 9/2003 | Zimniewicz et al. | |
| 6,640,278 B1 | 10/2003 | Nolan et al. | |
| 6,654,762 B2 | 11/2003 | Cheng et al. | |
| 6,665,658 B1 | 12/2003 | DaCosta et al. | |
| 6,684,369 B1 | 1/2004 | Bernardo et al. | |
| 6,691,117 B2 | 2/2004 | Ellison et al. | |
| 6,694,436 B1 | 2/2004 | Audebert | |
| 6,697,852 B1 | 2/2004 | Ryu | |
| 6,698,018 B1 | 2/2004 | Zimniewicz et al. | |
| 6,701,514 B1 | 3/2004 | Haswell et al. | |
| 6,704,776 B1 | 3/2004 | Fortune | |
| 6,718,358 B1 | 4/2004 | Bigus et al. | |
| 6,718,361 B1 | 4/2004 | Basani et al. | |
| 6,735,741 B1 | 5/2004 | Pannu | |
| 6,757,709 B1 | 6/2004 | Oberdorfer | |
| 6,760,711 B1 | 7/2004 | Gillett et al. | |
| RE38,598 E | 9/2004 | Frese et al. | |
| 6,829,593 B1 | 12/2004 | Ritter et al. | |
| 6,839,747 B1 | 1/2005 | Blumenau et al. | |
| 6,879,995 B1 | 4/2005 | Chinta et al. | |
| 6,892,226 B1 | 5/2005 | Tso et al. | |
| 6,895,430 B1 | 5/2005 | Schneider | |
| 6,922,735 B2* | 7/2005 | Chang | 710/5 |
| 6,941,353 B1* | 9/2005 | Lane | 709/219 |
| 6,985,937 B1* | 1/2006 | Keshav et al. | 709/223 |
| 7,000,028 B1 | 2/2006 | Broadhurst et al. | |
| 7,127,705 B2 | 10/2006 | Christfort et al. | |
| 7,134,122 B1 | 11/2006 | Sero et al. | |
| 7,152,207 B1 | 12/2006 | Underwood et al. | |
| 7,281,047 B2* | 10/2007 | Hayko et al. | 709/229 |
| 7,290,244 B2* | 10/2007 | Peck et al. | 717/109 |
| 7,496,645 B2* | 2/2009 | Yeung et al. | 709/223 |
| 7,703,092 B1* | 4/2010 | Glaser et al. | 717/177 |
| 2001/0011274 A1 | 8/2001 | Klug et al. | |
| 2001/0029523 A1 | 10/2001 | McTernan et al. | |
| 2001/0037399 A1* | 11/2001 | Eylon et al. | 709/231 |
| 2001/0047517 A1 | 11/2001 | Christopoulos | |
| 2002/0002569 A1 | 1/2002 | Nguyen et al. | |
| 2002/0037709 A1 | 3/2002 | Bhatia et al. | |
| 2002/0046083 A1 | 4/2002 | Ondeck | |
| 2002/0055351 A1 | 5/2002 | Elsey et al. | |
| 2002/0059291 A1 | 5/2002 | Rossiter et al. | |
| 2002/0066094 A1 | 5/2002 | Futakuchi | |
| 2002/0091850 A1 | 7/2002 | Perholtz et al. | |
| 2002/0104071 A1 | 8/2002 | Charisius et al. | |
| 2002/0112082 A1 | 8/2002 | Ko et al. | |
| 2002/0124055 A1 | 9/2002 | Reisman | |
| 2002/0129356 A1 | 9/2002 | Hellerstein et al. | |
| 2002/0147974 A1* | 10/2002 | Wookey | 717/176 |
| 2002/0157089 A1 | 10/2002 | Patel et al. | |
| 2002/0161924 A1 | 10/2002 | Perrin et al. | |
| 2003/0105672 A1 | 6/2003 | Epstein et al. | |
| 2004/0015961 A1* | 1/2004 | Chefalas et al. | 717/178 |
| 2005/0005096 A1 | 1/2005 | Miller | |

OTHER PUBLICATIONS

Kemper, A. et al., "Performance Tuning for SAP R/3" (1997) IEEE, pp. 1-12.
European Patent Office, "Communication Pursuant to Article 94(3) EPC", application No. 00907041.8-1527, dated Mar. 5, 2008, 6 pages.
Claims, application No. 00907041.8-1527, 4 pages.
Bershad, et al., "SPIN—An Extensible Microkernal for Application specific Operating System Services", Operating Systems Review, vol. 29, No. 1, Jan. 1995, XP-000881244, 4 pages.
Bharadvaj, Harini et al., "An Active Transcoding Proxy to Support Mobile Web Access," 1998, Proceedings of the $17_{th}$ IEEE Symposium on Reliable Distributed Systems, 6 pages.
Kanakia, Hemant et al., "An Adaptive Congestion Control Scheme for Real-Time Packet Video Transport," SIGCOMM '93, 1993, ACM, pp. 20-31.
IP Australia, "Examiner's First Report in Patent Application No. 2001291300," dated Aug. 1, 2006, 2 pages.
Claims AU Patent Application 2001291300, 3 pgs.
IP Australia, Examiner's First Report on Patent Application No. 2001295024 dated Apr. 12, 2006, 2 pages.
IP Australia, Examiner's Second Report on Patent Application No. 2001295024 dated Apr. 13, 2007, 2 pages.
Katic, G. et al., "A Prototype Model for Data Warehouse Security Based on Metadata," 1998, IEEE, pp. 300-308.
Kim, Young-Kuk et al., "A Database Server for Distributed Real-Time Systems: Issues and Experiences," 1994, IEEE, pp. 66-75.
European Patent Office, "Patent Examination Report," Application No. 00 907 041.8, dated Jul. 5, 2005, 9 pages.
Current Claims 1-10, Application No. 00 907 041.8, 3 pages.
Bieszczad, A. et al., "Agent-based Schemes for Plug-and-Play Network Components," Proc. 2nd. Int. Workshop, IATA '98, Intelligent Agents for Telecommunication Applications, Jul. 4-7, 1998, Paris, France, pp. 89-101.
Pree, W. et al., "Self-Configuring Components for Client-/Server-Applications", Proc. 9th. Int. Workshop of Database and Expert Systems Applications, Aug. 26-28, 1998, Vienna, Austria, pp. 780-783.

Schleipfer, S. et al., "The ServOS Kernel: A Special-Purpose Operating System Kernel for Server Machines," Proc. 2nd. IEEE Symposium in Parallel and Distributed Processing, Dec. 9-13, 1990, Dallas, Texas, pp. 121-125.

Spiro, P. et al., " Ubiquitous, Self-tuning, Scalable Servers," Proc. 1998 ACM SIGMOND International Conference on Management of Data, Jun. 1-4, 1998, Seattle, Washington, vol. 27, No. 2, pp. 512-515.

Joel Sommers et al., "Self-configuring network traffic generation", 2004, ACM Press, pp. 68-81.

Thomas E. Anderson et al., "Severless network file systems", Feb. 1996, ACM Press, vol. 14, Issue 1, pp. 41-79.

Japanese Abstract 2000-14845 dated May 30, 2000 to Mitsubishi Materials Corp. (1 page).

* cited by examiner

ONE CLICK DEPLOYMENT

RELATED APPLICATIONS

This application is a continuation of U.S. patent application Ser. No. 11/540,019, entitled "One Click Deployment", filed on Sep. 29, 2006 by Pascal Sero, et al., and issued as U.S. Pat. No. 8,176,484 on May 8, 2012, which is a continuation of U.S. patent application Ser. No. 09/872,646, entitled "One Click Deployment", filed on May 31, 2001 by Pascal Sero, et al., and issued as U.S. Pat. No. 7,134,122 on Nov. 7, 2006, the content of which is incorporated herein by reference.

This application is related to U.S. patent application Ser. No. 09/240,229, entitled "Pre-Defined Hardware And Software Bundle Ready For Database Applications," filed on Jan. 29, 1999 by Lawrence Ellison, et. al., and issued as U.S. Pat. No. 6,487,547 on Nov. 26, 2002, (herein referred to as "Ellison"), hereby incorporated by reference in its entirety.

This application is related to U.S. patent application Ser. No. 09/872,235, entitled "Techniques For Automatically Provisioning A Database Over A Wide Area Network", filed on May 31, 2001 by Jean-Louis Baffier, et al., and issued as U.S. Pat. No. 7,739,308 on Jun. 15, 2010, (herein referred to "Baffier"), hereby incorporated by reference in its entirety.

FIELD OF THE INVENTION

The present invention relates to installing software, and in particular, installing software hosted by application service providers.

BACKGROUND OF THE INVENTION

Many enterprises expect to use the Internet to reach far-flung agents and customers. The Internet is a public network of computer networks each with multiple nodes. The Internet uses open, standard protocols for addressing nodes and passing information from one node to another. A user accesses the Internet by logging onto one of the computers on the network, often owned and operated by an Internet Service Provider (ISP). Typically, a user establishes a severable link between the user's own computer and the ISP computer. A client application program (a client) running on the user's computer interacts with a server application program (a server) running on one of the nodes on the Internet.

The World Wide Web (the Web) is a collection of resources available over the Internet that are provided by various servers and that can be accessed by a particular client called a Web browser using a hyper-text transfer protocol (HTTP). Using a Web browser, a user can select a resource on the Web, identified by its Universal Resource Locator (URL) name, and have that resource presented to the user. The resource usually includes textual information and often includes graphical, video and audio elements.

For electronic commerce using the Web, the resource provided by the server must include a mechanism for accepting user information. For example, many Web resources include forms for accepting product orders. Effective transactions may also require the resource provide access to a database. For example, a database enables the server to track inventory of products available for purchase, or to find the account information requested by the client.

Any team that develops a Web site faces the challenge of having to deal with developing multiple components. The term component is used herein to refer to software (code or data) configured for a particular set of end users. A component may be a database base object or a software module that performs functions such as generating screen displays, receiving user input, and carrying out data processing operations that integrate and select data, and present the data to a user or to other processes which, in turn, present the data to the user. A set of integrated components that provide a particular functionality is referred to as an application. For example, a set of components that implement an accounting system is referred to as an accounting application.

Applications reside and run on an application infrastructure. The term application infrastructure refers to computer resources that may be shared by multiple users, including hardware, operating system, disk storage, and a database server, a web server, and an application server.

A particular configuration of an application infrastructure provided to an application is called an environment. For example, an environment may be a particular configuration that includes access to a particular directory or set of UNIX operating system functions, to a quantity of disk storage, to a database server under a user account, to a fixed number of database sessions, and to a tablespace (e.g. a set of data files used to hold data) dedicated to the application by a database server.

Developing and maintaining an application for an enterprise is an enormously complex undertaking requiring expert personnel. While a large enterprise has the finances to assemble a team having the requisite expertise, most enterprises are too small to assemble and support such a team. Small to medium sized enterprises need a way to generate an effective presence on the Internet, complete with an application, without incurring the full cost of a team of programmers and experts.

To offset these costs, enterprises employ service companies to maintain the applications and environments in which the applications run. The technique of using service companies to maintain and operate applications is referred to as application hosting. A hosting environment may be accessed via, for example, the Internet, or an extended intranet. Application hosting can reduce the cost of managing applications because it allows companies to share the resources needed to run an application, resources that not only include an application and its environment, but the experts needed to maintain the application and its environments, including computer administrative support personnel.

The term "user" is used herein to refer to a particular entity for whom an application and its associated data is being hosted. The entity may be a human individual or an enterprise.

Application hosting reduces costs by enabling an enterprise to combine resources with other enterprises to manage the complex process of maintaining applications and their environments. Another way to reduce costs is to reduce the complexity of this process. Various complex tasks included in this process are the creation and configuring of an environment needed to develop and run an application, and the installation of various application components into these environments. These tasks are collectively referred to as deploying software.

Producing software requires maintaining multiple environments to run various copies and versions of an application. These multiple environments include a development environment, a testing environment, a staging environment, and a production environment. The development environment is used to develop software. Access to the environment is limited to developers. The testing environment is used to test software. Access to the environment is limited to testers. The production environment is an environment where an application is used by an end user. The staging environment simulates a particular production environment, and is thus configured similarly to a particular production environment, and is used to test how well an application will run in the production environment.

Deploying an application is a laborious and complex process. Those that perform the task have to deal with a large range of technology. The process entails, for example, analyzing an application to determine a suitable environment for it, identifying the application's various components, installing and configuring hardware and operating systems for a new environment, configuring an existing environment, running installation routines to install application components, and configuring network and security mechanisms.

Based on the foregoing, it is clearly desirable to provide a system that reduces the complex task of deploying software.

SUMMARY OF THE INVENTION

Techniques are provided for deploying applications hosted by an application service provider. According to an aspect of the present invention, an application in a first environment is automatically deployed to a second environment in response to receiving a request over a network from the party for whom the second environment is being hosted. The first environment may be an environment where applications are developed by the party over the network. Deployment of the application may entail provisioning of an environment for the application.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for deploying an application are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Described herein is a process for deploying an application into a hosted environment. The process of collecting information about the deployment may be initiated through user interfaces transmitted to a user over the Internet. After the requisite information has been collected, the actual deployment operation is initiated by clicking a command button in the user interface. The deployment is then completed without human intervention. Because deployment may be completed in this manner, the deployment process is referred to as "one-click deployment".

One-click deployment automates the onerous task of deploying software, thereby reducing the cost of maintaining and developing applications. A one-click deployment process is illustrated herein by using the process to deploy an application from the hosted development environment where the application is developed, to other environments, such as the testing, staging, and production environments. The development of an application is an iterative process involving repeated deployments between environments. For example, when developing an application, it may be developed, deployed to a testing environment, tested, and then further developed and redeployed to a testing environment. Automating the deployment process significantly reduces the time and cost incurred to develop an application.

The capability to cheaply and quickly deploy an application from a hosted development environment to another hosted environment creates significant advantages for vendors of packaged applications, especially relatively small vendors. A vendor may develop an application on a hosted environment, where it can be readily deployed to customers. The vendor can realize the benefits of such a deployment system while being insulated from the burdens of managing or undertaking deployment of the application.

Development Service Provider System

Figure 1:
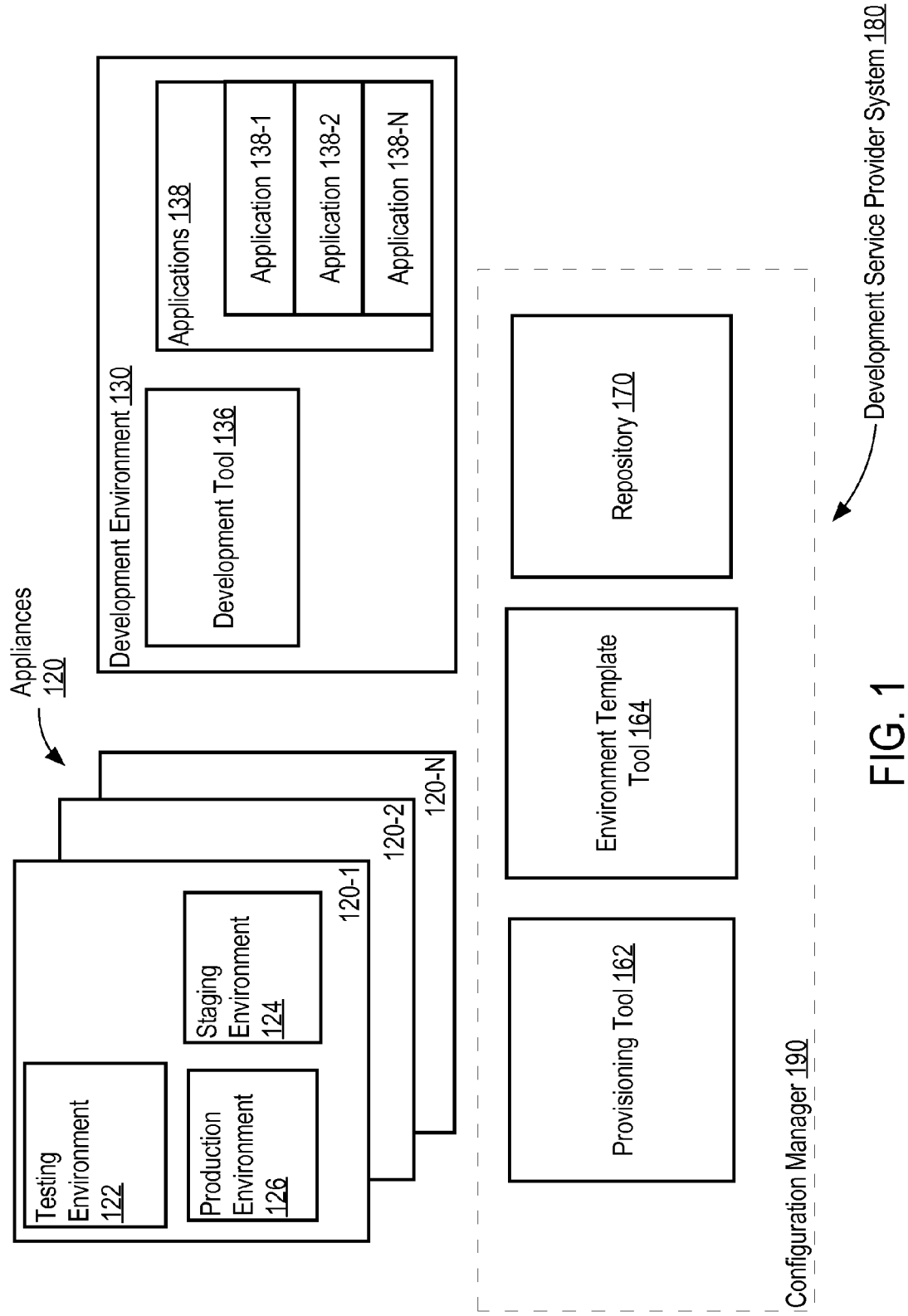
FIG. 1 is a block diagram that depicts a development service provider system used by development service providers to host development environments for applications according to an embodiment of the present invention.

FIG. 1 shows development service provider system 180 and some of its constituent parts, according to an embodiment of the present invention. A development service provider system hosts environments and applications for users, and provides tools that may used by the users to request environments and develop the applications. Development service provider system 180 includes appliances 120, development environment 130, and configuration manager 190. Appliances 120 and development environment 130 are coupled to development service provider system 180 via a network (not shown), such as a local area network or a virtual private network.

Appliances 120 include appliances 120-1 through 120-N. Appliances 120 are devices that are (1) configured to participate with configuration manager 190 to integrate themselves into development service provider system 180, and (2) to participate with configuration manager 190 to provision environments. An example of an appliance is a database appliance described in Ellison.

The term provisioning refers to operations carried out to enable a set of resources to be used in a particular way by an entity. For example, provisioning a database server entails operations that allow a user to access the database server, operations such as establishing an account, or, if needed, installing the database server. Provisioning a digital subscriber line for a home may entail establishing an account on a remote server connected to the home's phone wiring, and if needed, adding a network card to the home computer and as well as other hardware.

Provisioning the resources for an environment is referred to as provisioning the environment. Thus, provisioning an environment may entail configuring resources such as a web server and database server, and consumable resources, such as storage space, central processing unit (CPU) usage, and connection bandwidth.

Depending on the resources hosted for a user on an appliance, an appliance may be either a dedicated device or a shared appliance shared by a plurality of users. If the customer has exclusive access to all resources provided by an appliance, that appliance is configured as an appliance dedicated to that user. If, however, a customer requires only a portion of the resources that are provided on an appliance, then that appliance can be shared among several customers. The user may share access to many of the resources that reside on an appliance. For example, users may share a database server and web server.

An appliance may have multiple environments for multiple users. An appliance 120 has testing environment 122, staging environment 124, and production environment 126 for a particular user. An appliance may be configured for any combination of environments for any combination of users. For example, an appliance may have the testing environments of multiple users, or have the staging and production environment of a single user.

Development environment 130 is an environment shared by multiple users. It hosts applications 138, which are applications being developed by users. Applications 138 include application 138-1 through 138-M, each of which is developed by a particular user.

Applications 138 are developed by users using development tool 136 in development environment 130. An application development tool, such as development tool 136, is software that interacts with a user to generate components of an application according to user input provided by the user.

Development tool 136 generates a range of components. This range includes web pages, user forms, and database objects (e.g. tables, views), and code that implements the processes and functions performed by an application.

A user interacts with a development tool 136 through wizards. A wizard is a series of one or more screens (e.g. user forms) for receiving input for performing an operation. The screens may be transmitted as one or more web pages to a user over the Internet. These web pages may contain embedded code, scripts, or programs that are executed at a client. These programs can be, for example, Java applets, Java scripts, or ActiveX controls. The programs may be stored temporarily in the cache of a client, or more permanently as, for example, one or more plug-in applications.

Configuration manager 190 is a combination of software and hardware responsible for configuring appliances 120 and other entities in development service provider system 180. Configuration manager 190 includes provisioning tool 162, environment template tool 164, and repository 170. Repository 170 contains metadata describing resources available on appliances 120 and how they are configured for users.

Figure 2:
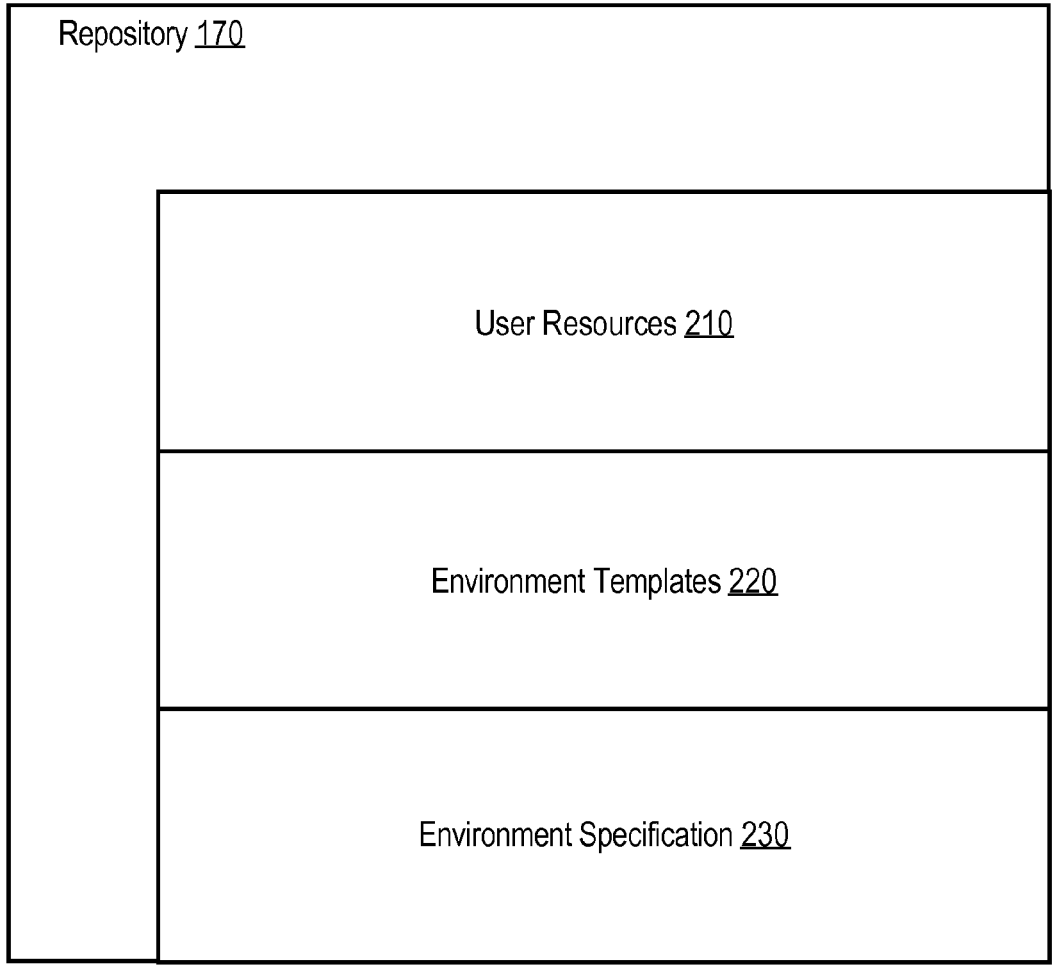
FIG. 2 is a block diagram that depicts a repository used by a development service provider system to track various elements hosted by the development service provider system according to an embodiment of the present invention.

FIG. 2 is a block diagram that shows repository 170 in greater detail. Referring to FIG. 2, repository 170 includes user resources 210, environment templates 230, and environment specifications 230. User resources 210 include data describing the resources and environments hosted for a particular user.

Environment templates 220 are a collection of environment templates. An environment template describes a logical grouping of resources.

Environment specifications 230 are a collection of environment specifications. An environment specification contains detailed parameters about a particular environment on an appliance, including what applications use the environment and how the resources are configured for the environment. An environment specification may specify, for example, that a particular environment includes a database server and a web server, and how these resources are configured for a particular application, including sizing parameters. Sizing parameters specify how much of a resource is available to a user or application. Sizing parameters for a database server may specify, for example, the number of rows or megabytes of disk storage used for a particular application.

Environment template tool 164 is used to define user-defined environment templates. Environment configuration tool 164 provides wizards with which users may interact to define environment templates. Other environment templates may be default environment templates, which describe commonly used groupings of resources. Default environment templates are defined by the administrators of development service provider system 180.

A provisioning tool, such as provisioning tool 162, is a combination of hardware and software that interacts with an "application source", such as development environment 130, to install the components of an application and, if needed, provision a "target environment" for the application. An application source is a combination of software and hardware configured to supply the code and data needed to install the components of an application. An application source may simply be a repository of code or data, an installable package (e.g. Java Archive Repository), or a server configured to interact through an application programmer interface ("API") to supply application components. If the target environment already contains a version of the application to install, the provisioning tool may update the version of the application in the target environment. In addition, a provisioning tool may access other sources of information to determine how to install an application and provision an environment. For example, provisioning tool 162 accesses an environment template to determine what resources to provision for an application and how and accesses repository 170 to determine where to install the application components. An example of a provisioning tool is the IDSP provisioning process and database provisioning process described in Baffier.

One Click Deployment to New Environments

Figure 3:
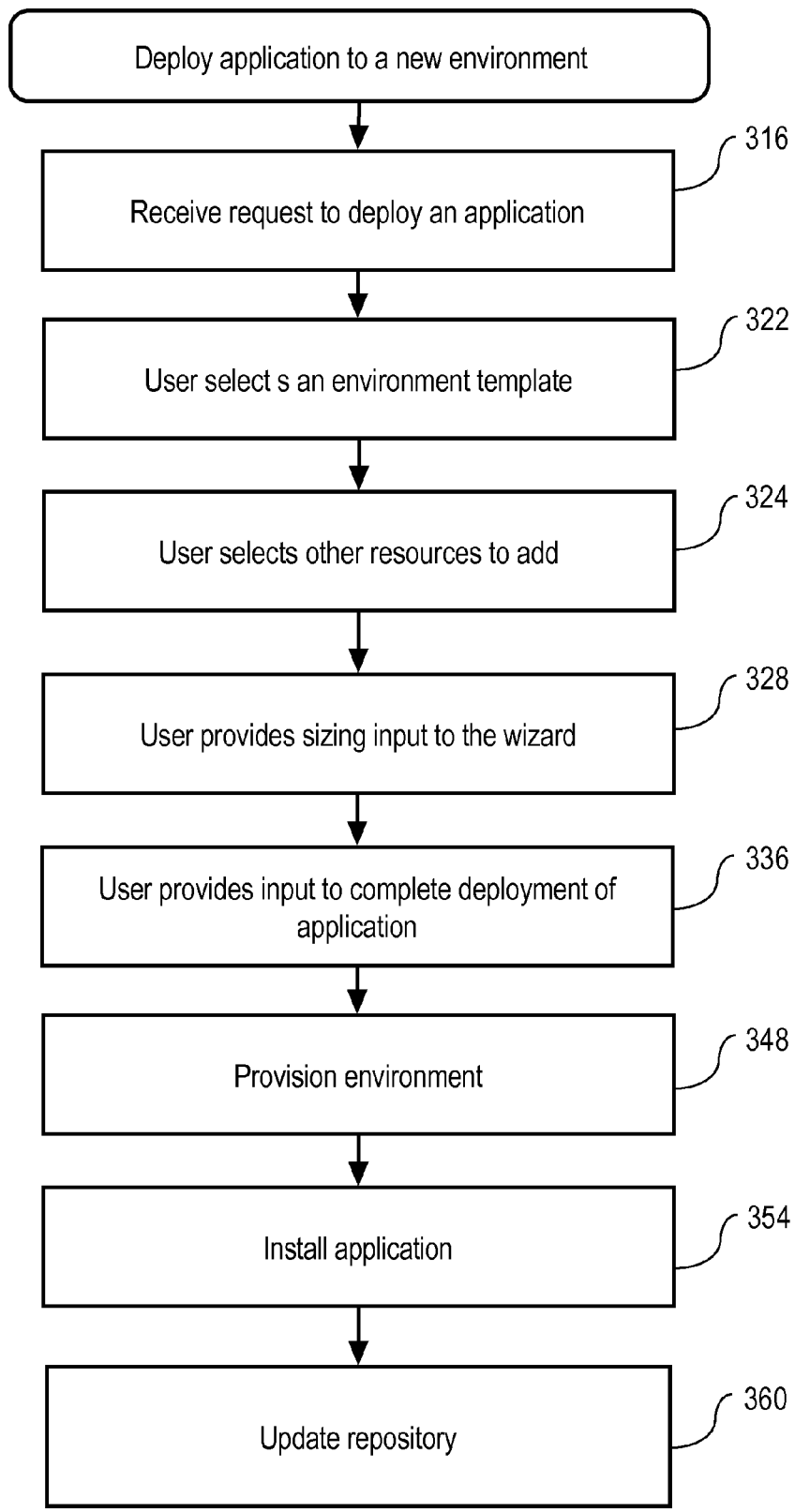
FIG. 3 is a flowchart that depicts a process for deploying an application according to an embodiment of the present invention.

FIG. 3 is a flowchart depicting a process for deploying an application to a new target environment. The following process involves user interaction with development service provider system 180. This interaction occurs through one or more wizards transmitted to a client on behalf of a user. In the following description of the process, the wizards are described as receiving user input or performing other actions. However, this is just a convenient way of expressing that a device is performing these actions in response to executing a wizard.

Referring to FIG. 3, at step 316, a request is received to deploy an application. There are a variety of ways a user may request the deployment of an application. The user may have the ability to request a particular application as part of a larger set of functions that may be accessed through a wizard provided by development tool 136. Alternately, an administrator may issue a request by accessing a function that is part of a larger set of functions used by administrators to manage development service provider system 180.

At step 322, the user selects an environment template from a list of environment templates listed by the wizard. Alternatively, an environment template may be automatically selected based on information about the application stored in development tool 136. At step 324, the user selects other resources to provision in the environment. The other resources are resources not covered by the selected environment template. The user may select from a list of resources presented by the wizard.

At step 328, the user provides sizing input to the wizard. The sizing input may be any information used to determine sizing parameters. Such input may be, for example, the number of users concurrently accessing the application, how often the user accesses the application, the number of transactions that may occur within a period of time, and a number of records to generate. The present invention is not limited to any particular type of sizing input.

At step 336, the user provides input to initiate the actual deployment of the application. The input may be provided by clicking a command button presented in the wizard. In response, the application provisioning tool 162 provisions a target environment and installs the application. More specifically, at step 348, provisioning tool 162 provisions the environment. This step may entail a variety of tasks such as (1) determining sizing parameters based on the sizing input provided, (2) selection of an appliance that has sufficient available resources, and (3) provisioning resources specified in steps 322 and 324.

For example, assume that a testing environment is being provisioned. Based on input provided at step 324, the environment should include access to a database server that supports up to ten user sessions and that has 120 megabytes of storage. The provisioning tool selects an appliance that has a database server and at least 120 megabytes of storage that may be used by the database server. Provisioning tool 162 then configures a user account through which the application to install may access the database server. The user account supports up to ten user sessions.

At step 354, provisioning tool 162 installs the application. Installing the application may entail such tasks as (1) retrieving code modules for the application from the development environment and installing them in the target environment; (2) creating a tablespace to hold data for the database objects defined for the application; and (3) creating in the database server a tablespace that meets the sizing requirements, as well as database objects.

At step 360, provisioning tool 162 updates repository 170. Specifically, environment specification 230 is updated to record the existence of the new target environment, the sizing parameters, and which application has been installed within the target environment. User resources 210 are updated to record the provisioning of the new target environment for the user, and the fact that the application is installed within the target environment.

One Click Deployment to an Existing Environment

Developing software is an iterative process which may involve deploying and re-deploying applications to environments that have been established before a deployment is initiated. For example, when developing an application, it may be developed, deployed to a testing environment, tested, and then further developed and redeployed to a testing environment. Thus, an application may be deployed, numerous times, to an environment that already exists. Each new deployment may involve the installation of new application components or new versions of application components.

Figure 4:
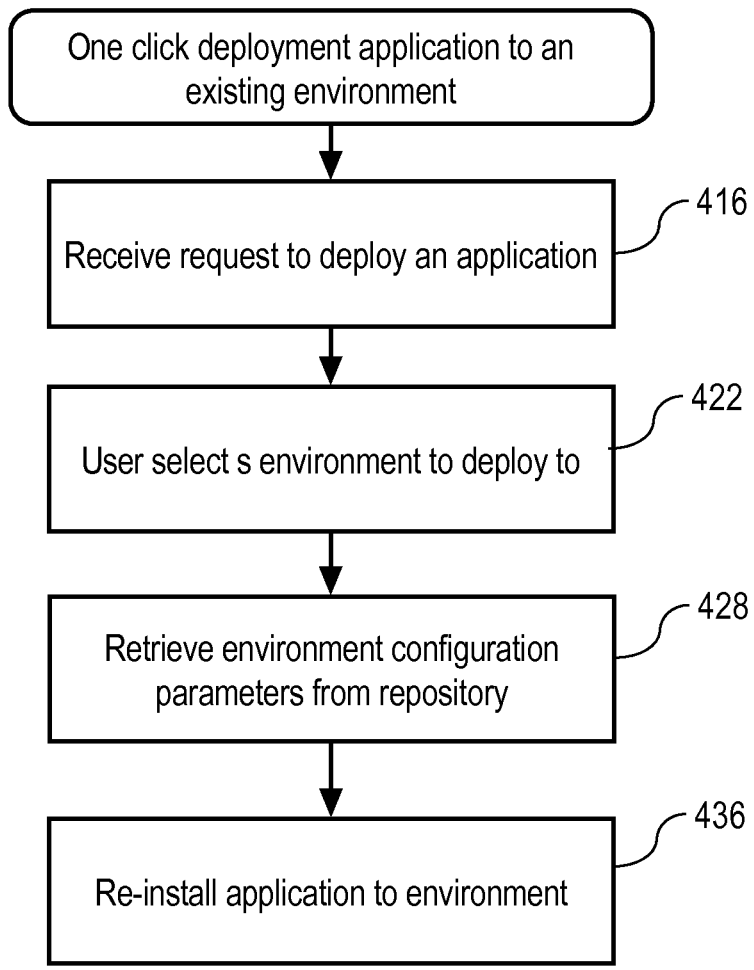
FIG. 4 is a flowchart that depicts a process for deploying an application according to an embodiment of the present invention.

FIG. 4 is a flowchart depicting a process performed to deploy an application to an environment that has already been established. The following process involves user interaction with development service provider system 180. This interaction occurs through one or more wizards transmitted to a client on behalf of a user.

Referring to FIG. 4, at step 416, a request is received to deploy an application. As discussed with respect to step 316, there are a variety of ways a user may request the deployment of an application.

At step 422, the user selects a target environment to deploy to. The user may select from a list of environments presented by a wizard. The list contains environments created for the user. Information from which the list is derived may be obtained from user resources 210.

At step 428, provisioning tool 162 retrieves configuration information for the selected target environment from repository 170, and in particular, environment specifications 230. The information is needed because the environment may need to be configured so that new application components, or new versions of application components, may access the resources of the target environment.

At step 436, provisioning tool 162 re-installs the application. Re-installing an application may involve replacement of components with newer versions of those components, installation of new components, and reconfiguration of the environment so that the updated application may access the resources as needed. Installation of new components may involve, for example, installing new code modules and defining or re-defining new database objects.

In the case of deployment from a staging environment to a production environment or a testing environment to a staging environment, steps 416 and 422 may be performed through one or more wizards provided by configuration management tool 180. In addition, access to these wizards may be limited to personnel responsible for managing deployment and configuration.

Other Embodiments

The present invention has been illustrated using specific embodiments thereof. However, other embodiments are possible.

For example, use of the Internet is not required. Users may interact with the system of an application service provider over any type of public or private network.

An application may be deployed from an application source other than a development tool. For example, a one-click deployment process may be used to install a packaged application. Such a process would entail selection of the application package and installation of the package into a new or existing environment, provisioned as needed.

Use of appliances is also not required. The methods described herein may be implemented using various other types of computers and devices, such as general purpose computers.

Hardware Overview

Figure 5:
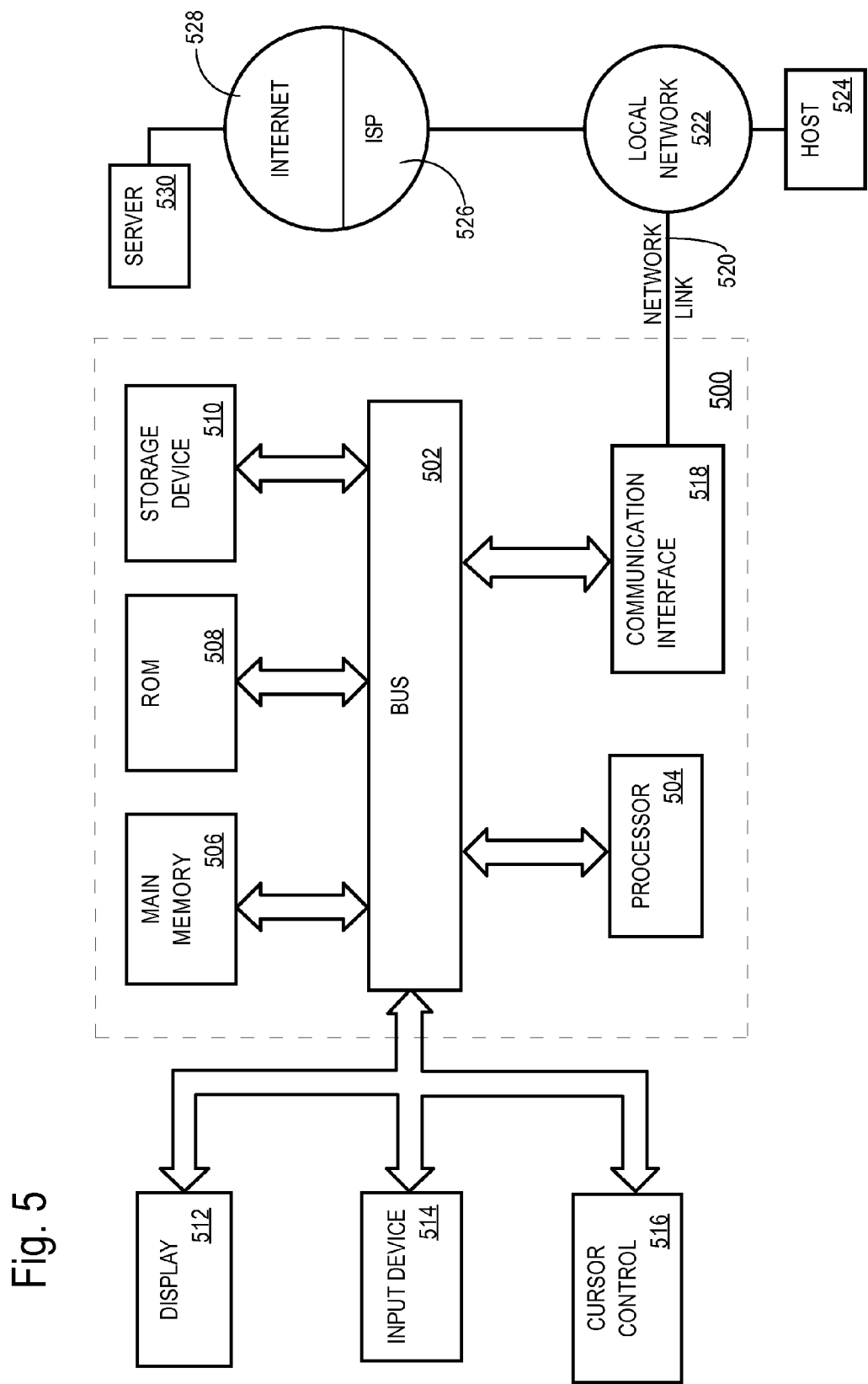
FIG. 5 is a flowchart that depicts a computer system that may be used in an embodiment of the present invention.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A computer-implemented method, the method comprising steps of:
transmitting one or more user interface wizards over a network, said user interface wizards configured for generating, based on information entered by a human user interacting with said user interface wizards, user input indicating resources needed to provision a plurality of application components and resources needed for a database server to manage database objects to be accessed by said plurality of application components;
receiving over said network said user input;
receiving over said network a request to deploy said plurality of application components into a hosted environment accessible to a party over the network; and in response to receiving said request to deploy:
provisioning said hosted environment for said plurality of application components in a manner that allows said party to cause, over said network, execution of said plurality of application components, wherein said provisioning said hosted environment comprises:
configuring a database server so that said database server may be accessed by said plurality of application components during said execution of said plurality of application components, and
provisioning one or more database objects in a database managed by said database server that stores data that is accessed by said execution of said plurality of application components;
installing said plurality of application components into said hosted environment; and
wherein the steps are performed by one or more computing devices.

2. The method of claim 1, wherein the network includes the Internet.

3. The method of claim 1, wherein the steps further include a party interacting with a development tool over said network to develop said plurality of application components.

4. The method of claim 3, wherein the network includes the Internet.

5. A non-transitory computer-readable medium storing one or more sequences of instructions which, when executed by one or more processors, causes performance of steps comprising:
transmitting one or more user interface wizards over a network, said user interface wizards configured for generating, based on information entered by a human user interacting with said user interface wizards, user input indicating resources needed to provision a plurality of application components and resources needed for a database server to manage database objects to be accessed by said plurality of application components;
receiving over said network said user input;
receiving over said network a request to deploy said plurality of application components into a hosted environment accessible to a party over the network; and
in response to receiving said request to deploy:
provisioning said hosted environment for said plurality of application components in a manner that allows said party to cause, over said network, execution of said plurality of application components, wherein said provisioning said hosted environment comprises:
configuring a database server so that said database server may be accessed by said plurality of application components during said execution of said plurality of application components, and
provisioning one or more database objects in a database managed by said database server that stores data that is accessed by said execution of said plurality of application components; and
installing said plurality of application components into said hosted environment.

6. The non-transitory computer-readable medium of claim 5, wherein the network includes the Internet.

7. The non-transitory computer-readable medium of claim 6, wherein the steps further include a party interacting with a development tool over said network to develop said plurality of application components.

8. The non-transitory computer-readable medium of claim 7, wherein the network includes the Internet.

9. A computer system comprising one or more computers, said one or more computers configured to perform steps comprising:
transmitting one or more user interface wizards over a network, said user interface wizards configured for generating, based on information entered by a human user interacting with said user interface wizards, user input indicating resources needed to provision a plurality of application components and resources needed for a database server to manage database objects to be accessed by said plurality of application components;
receiving over said network said user input;
receiving over said network a request to deploy said plurality of application components into a hosted environment accessible to a party over the network; and
in response to receiving said request to deploy:
provisioning said hosted environment for said plurality of application components in a manner that allows said party to cause, over said network,
execution of said plurality of application components, wherein said provisioning said hosted environment comprises:
configuring a database server so that said database server may be accessed by said plurality of application components during said execution of said plurality of application components, and
provisioning one or more database objects in a database managed by said database server that stores data that is accessed by said execution of said plurality of application components; and
installing said plurality of application components into said hosted environment.

10. The computer system of claim 9, wherein the network includes the Internet.

11. The computer system of claim 10, wherein the steps further include a party interacting with a development tool over said network to develop said plurality of application components.

12. The computer system of claim 11, wherein the network includes the Internet.

* * * * *

UNITED STATES PATENT AND TRADEMARK OFFICE
CERTIFICATE OF CORRECTION

PATENT NO. : 8,438,562 B2
APPLICATION NO. : 13/454997
DATED : May 7, 2013
INVENTOR(S) : Sero et al.

Page 1 of 1

It is certified that error appears in the above-identified patent and that said Letters Patent is hereby corrected as shown below:

On Title page 2, item [56] in column 2, under "U.S. Patent Documents", line 18, delete "McTernan" and insert -- Mcternan --, therefor.

On Title page 2, item [56] in column 2, under "Other Publications", line 7, delete "Microkernal" and insert -- Microkernel --, therefor.

On Title page 2, item [56] in column 2, under "Other Publications", line 11, delete "$17_{th}$" and insert -- $17^{th}$ --, therefor.

On Title page 3, item [56] in column 2, under "Other Publications", line 3, delete ""Severless" and insert -- "Serverless --, therefor.

Signed and Sealed this
Third Day of September, 2013

Teresa Stanek Rea
*Acting Director of the United States Patent and Trademark Office*